Jan. 27, 1970    W. R. WEAVER    3,491,975
TELESCOPE SIGHT MOUNT
Filed May 22, 1968    2 Sheets-Sheet 1

William R. Weaver
INVENTOR
BY Arnold, Roylance,
Kruger & Durkee
ATTORNEYS

United States Patent Office 3,491,975
Patented Jan. 27, 1970

3,491,975
TELESCOPE SIGHT MOUNT
William R. Weaver, El Paso, Tex., assignor to W. R. Weaver Company, El Paso, Tex., a corporation of Texas
Filed May 22, 1968, Ser. No. 731,158
Int. Cl. F41g 1/38
U.S. Cl. 248—226                 22 Claims

ABSTRACT OF THE DISCLOSURE

The present invention pertains to an improved mount for attaching a telescopic sight to a firearm. The mount features a projection insertable in a suitable fire arm opening and clamping means for circumferentially or laterally urging the projection against one side of the opening. This lateral urging positively circumferentially locates and securely clamps the mount to the firearm. When the opening has a circumferential dimension, absolute axial constraining is also provided by the lateral urging of the projection. A preferred clamping means includes a second opening in the firearm at an angle acute with the first opening, and a tapered screw guided by a tapped opening in the mount at an angle to the second firearm opening such that tightening the screw causes the mount by its projection in the first opening to be located and secured to the firearm.

BACKGROUND OF THE INVENTION

Field of the invention

This invention relates to the mounting of telescopic sights to firearms and, more specifically, to an improved and simplified mounting system for a supporting structure which carries such telescopic sights.

In mounting a telescopic sight to a firearm, it is desirable to approximate several important goals or aims as much as possible, even though some goals conflict and require compromise in any joint solution. First, a telescopic sight should be, as much as possible, an integral part of the firearm to which it is mounted. The chief reason for this is that there should be a unity between the telescopic sight and the firearm to achieve undisturbable sighting alignment with missile projection from the firearm, this alignment remaining constant at all times, even in the presence of rifle recoil.

Second, a telescopic sight should be replaceable, and quickly so, to facilitate repairing and to make the weapon sighting more flexible (so that telescopic sights of different powers may be employed with the same firearm or so that the firearm may be used with open sights).

Third, assuming that a telescopic sight is made replaceable, it should be replaceable with certainty and with simplicity. This means that every time a telescopic sight is removed and replaced, it is highly desirable that it be in the exact position and location that it was to begin with. No adjustments whatsoever should be required merely because of replacement.

Fourth, the number of parts should be kept to an absolute minimum, so as to make the mounting operation fool-proof and so as to minimize the number of parts that could malfunction.

Fifth, also assuming that a telescopic sight is made replaceable, it should be mounted in such a manner that the recoil or other shock to the firearm does not axially relocate the mount, thereby disturbing the sight settings.

DESCRIPTION OF THE PRIOR ART

To achieve at least some of the goals, recent developments in mounts have included a mount which locates on the sides of parallel grooves in a firearm and which includes a clamp having teeth that grip into the side of a groove (achieving some stability against shock). Such a mount is shown and described in Kingsbury Patent 3,253,361.

Also, a mount has been developed having holes that fit over upstanding posts previously attached to a firearm. The mount includes laterally tightenable set screws in the body of the mount acting sideways in the holes to grip the upstanding posts (as an attempt to achieve positive location, quick removal and an insurance against movement caused by recoil shock).

However, the prior art mounts that have probably been the most successful in achieving to some degree all of the desirable goals outlined above is described in Weaver Patent 2,632,251, wherein the mounts therein described use a base plate screwed onto the firearm having longitudinal locating surfaces along opposite sides of a center line (or alternatively, grooves cut into the firearm to provide these surfaces), a telescopic sight support structure having an integral side thereof for locating on one of the locating surfaces, and a screw-tightenable means (such as a clamp guided over a screw post) for locking the support structure on the other of the locating surfaces.

A screw post (part of the screw-tightenable means mentioned above) rests across the firearm in a transverse groove in the exposed surface of the top mount base therein described to limit axial recoil movement of the mount clamped to the base. A screw screwed directly into the base in the side mount structure prevents recoil shock movement.

Heretofore, the basic structures just described were believed by the industry to be the optimum mount supports for a telescopic sight for achieving, as nearly as possible, all of the previously set forth goals. However, as will become evident, none of the prior art structures has accomplished all the goals hereinabove set forth to the extent achieved by the inventive structures herein to be described.

SUMMARY OF THE INVENTION

The inventive mount which is herein described is attached to the firearm through at least one transverse opening therein, this opening being typically a hole bored in the firearm receiver or barrel. An opening, being fixed in location, provides a positive locating surface for receiving a projection depending from a mount. Also, such a bored opening also provides an axial limit or stop to prevent the received projection from being displaced in the presence of recoil or other shock to the firearm. The mount is positively secured with respect to the opening in its proper position on the firearm by a clamp means that pulls the mount laterally against the inside surface of the opening, this surface thereby becoming the locating surface. Since a bored-type opening has circumferential dimension with an extreme lateral part (with respect to the remainder of the opening) in which the projection is laterally held by the clamping action, the projection is also prevented from moving axially, even when there is a shock to the firearm such as caused by recoil effect.

One convenient clamp means includes a second opening in the firearm (which may be similar to the first but circumferentially disposed therefrom) and a screw threaded through a tapped hole in the main body portion of the mount and entering the second opening. When the screw is made to screw into the second opening by the angle of the tapped mount hole in which it acts at an angle which is at a greater angle with respect to the first opening than is the angle of the second opening to the first opening, then as the screw is tightened the amount is pulled or urged in the direction of the second opening. This means the projection in the first opening is pulled against the inside surface of the first opening, as described above. An observed advantage of this type of clamping means is its propensity to tighten during use. That is, the rifle recoil actually tightens a screw having right-hand threads in the second opening in which it is secured.

The locating (first) opening may take the form of a round bore, a triangular hole, a square hole, a groove in the firearm, a groove formed in a raised portion of the firearm (both of which would have a partial circumferential scoop or notch taken therein to provide the axial displacement stop function) or any other configuration. The opening also may be at a radial angle to the missile bore, may be at a chordal angle with respect thereto, or may be at askew angle with respect to the axis of the missile bore.

The clamp means may be the second opening and screw described above, it may be a clamp means as shown in Patent 2,632,251, it may be a clamp means as shown in Patent 3,253,361, or it may be any other convenient clamping means that provides the necessary urging, additional ones of which are more fully described hereinafter.

BRIEF DESCRIPTION OF THE DRAWINGS

So that the manner in which the above-recited advantages and objects of the invention, as well as others which will become apparent, are attained can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments. In the drawings.

DESCRIPTION OF THE PREFERRED EMBODIMENTS

Figure 1:
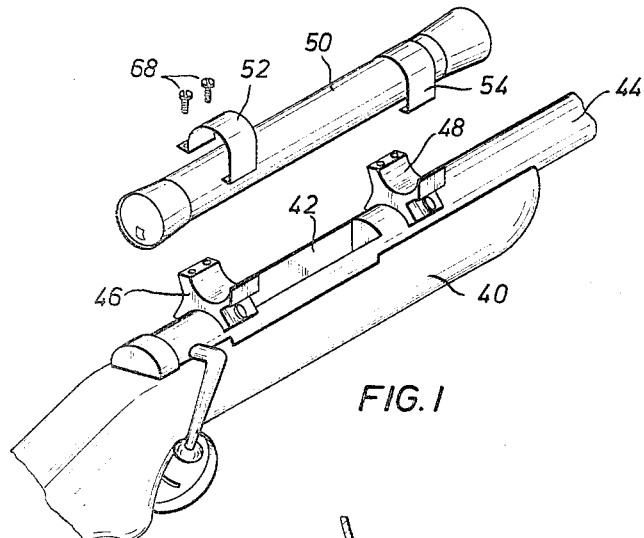
FIG. 1 is a partial oblique view of a firearm showing a mount in accordance with the present invention mounted thereon prepared to receive a telescopic sight.

In the description that follows, certain words and expressions are used in a sense which may be different from their ordinary dictionary definitions. For example, an "opening" as defined herein is a penetration in the surface of a part, such as a firearm barrel, receiver, etc., and may be made by drilling, boring, notching, grooving, etc. Also, an "opening" as defined herein includes a notch, groove, etc., in a raised portion of a firearm surface capable of functionally limiting the movement of a complementary projection operating therewith in at least one direction.

An opening located in the surface of the part may be open or penetrate entirely through the part, or there may be only a partial penetration, such as would normally be the case of an opening bored into a firearm barrel which would not connect with the missile bore.

Forming a conventional elongate groove either in the surface of a normally rounded firearm part, such as the receiver, or that results from a firearm part being raised in such a manner to form a groove, does not normally produce an opening having a "circumferential dimension." In other words, there is no axially limiting stop for confining the mating part in the groove, only a circumferential stop in one direction. Of course, such a partial circumferential dimension can be made in a groove, when desired, which would then create an axial stop.

"Transverse" as used herein with respect to a firearm refers to the direction of any opening having a dimension that is not parallel to the missile bore. In any particular instance, the opening may be generally radial to the missile bore, at a right-angle crosswise to the missile bore, or askew thereto (not having any principal bearing which is at a right-angle to the missile bore).

In the following discussion of the invention mount embodiments, various means are used from embodiment to embodiment for urging a projection from the mount against the inside surface of an opening, thereby effecting positive location of the mount on the firearm. In the preferred configuration of parts shown in FIG. 4, a mount body 10, typically made of an aluminum alloy, is shown having a wear-resistant projection 12, normally of hardened steel, press-fitted in an appropriate opening in the mount body. The projection is approximately radial to the missile bore of the firearm to which the firearm is secured, the projection being located when the mount is positioned for use on the firearm within an opening 14, which is slightly larger in diameter than the projection 12. Projection 12 is also considerably shorter than receiving opening 14 so that the bottom of the opening has nothing to do with the positioning of the projection, and hence the positioning of the mount. When mount 10 is urged circumferentially in direction 16, V-surfaces at opening 14 resist the pressure exerted against them. These V-surfaces are (1) surface 18 at the surface of the firearm which comes into contact with the mount at the side of the projection in the direction of urging, and (2) surface 20 at the firearm surface on the inside surface of opening 14 in the direction of urging, or the surface against which the projection 12 is urged. The resistance offered by these surfaces when urging is effected causes the portion 22 of the mount mating with the firearm surface on the side of the projection opposite from V-surfaces 18 and 20 to be pressed very firmly to the firearm in the direction of arrow 24. Hence, portion 22 carries the majority of the contacting pressure between the mount and the firearm at this side of the mount.

Figure 4:
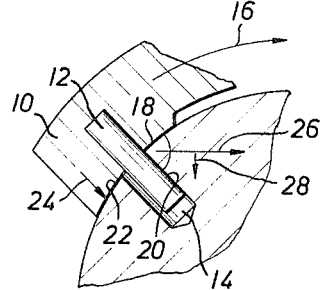
FIG. 4 is a partial cross-section view of a typical mount in accordance with the present invention connected to a firearm and showing a preferred configuration of locating parts.

A cross-sectional view in FIG. 4 depicts a mount centrally disposed and centered over a firearm. For purposes of the discussion, it is assumed that the circumferential arc of the mount is sufficiently long and the curvature of the firearm is sufficiently great that the effective horizontal urging force 26 and vertical force 28 at V-surfaces 18 and 20 caused by circumferential urging in direction 16 are of such relative magnitude to cause the above-described pressure of portion 22.

Figure 5:
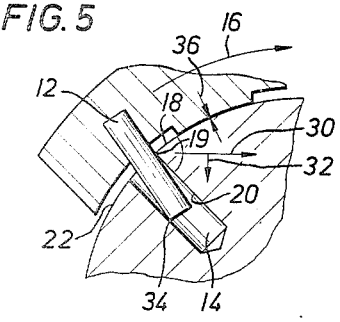
FIG. 5 is a partial cross-sectional view of a typical mount in accordance with the present invention connected to a firearm and showing another configuration of locating parts.

On the other hand, in FIG. 5, the respective effective horizontal and vertical urging forces 30 and 32 at the V-surfaces corresponding to surfaces 18 and 20 in FIG. 4 are not of relative magnitude to cause pressure of portion 22 against the firearm. Instead, circumferential location is determined by (1) the contact of point 19 between surfaces 18 and 20 at the opening surface of opening 14 with projection 12 from the mount and (2) contact at point 34 on the end of projection 12 with the inside surface of opening 14 away from or opposite the direction of urging. In any event, the inside surface of opening 14 still positively bears against the projection and determines the exact circumferential location of the mount. Since the precision of dimensioning the projection (length and width) and opening (inside diameter) is so critically important to the exact placement of the mount, the FIG. 5 illustration shows a possible, but less preferred, structural relationship of parts than the structure shown in FIG. 4.

Now referring to FIG. 1 of the drawings, a partial view of a firearm is shown, specifically that part of a rifle 40 that includes the receiver 42 and the rear portion of the rifle barrel 44. Secured to the receiver is a typical mount 46 for mounting a telescopic sight. Similarly, mount 48 is secured to barrel 44, mount 48 being identical to mount 46.

It may be seen that mounts 46 and 48 are shaped to conform to the outside curvature of telescopic sight 50 which they receive. To secure the telescopic sight within mounts 46 and 48, which are tandem-positioned so that they together secure the front and rear portion of the telescopic sight, are clamps 52 and 54, respectively. These clamps, together with the mount body means or portions which conform to the telescopic sight, are referred to as "rings" in the art. Clamps 52 and 54 each has an in-turned lip for latching with a complementary body means hook, which will be described more fully hereinafter, on one side and an outwardly turned lip on the opposite side to permit screws to connect the clamp to the mount body. This action also will be described more fully hereinafter. The assembled telescopic sight and the two mounts having their clamps tightly screwed thereto form a complete unitary telescopic sight system which may be attached to and detached from the firearm more conveniently at the mount than at the clamp.

Figure 2:
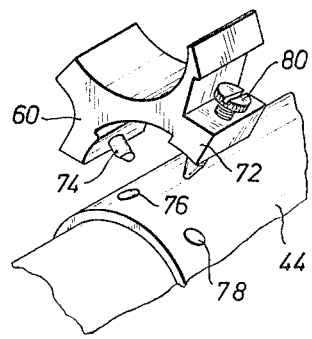
FIG. 2 is an oblique view of a mount in accordance with the present invention positioned for attachment to a firearm.

A closeup of a preferred mount embodiment 60, which may be the mount 46 or 48, is shown in FIG. 2. The body portion of the mount 60 is conformed to receive or carry the telescopic sight, as may be seen more clearly in the cross-sectional view of this mount shown in FIG. 3. On the right side of FIG. 3 the in-turned lip 62 of the clamp operating with the mount overlaps a complementary mating hook surface 64 on the mount body in such a manner to grasp clamp lip 62. On the opposite (left) side of the clamp is an outwardly turned lip 66 having therein holes for receiving screws 68, which screws are received in tapped screwholes in mount body 60. Screws 68 are long enough to effect engagement with the receiving screwholes in mount body 60 and, upon loosening, to permit lip 62 to be disconnected from downwardly projecting surface 64 on the right side. To tighten the telescopic sight to mount 60, screws 68 can be screwed all the way in, if necessary, but ordinarily the telescopic sight is of sufficiently large relative diameter with respect to the clamp that screws 68 are tightened before the clamp meets the mount body surface in which the screwholes are located. Although one convenient clamp means is shown for holding the telescopic sight to the mount, any other convenient clamp means may be used, as this portion of the structure is not part of the invention.

The surface of mount 60 that comes into contact with the surface of the firearm to which the mount is secured (which may be the barrel, the receiver or other part) preferably has two legs 70 and 72 on either side of the mount body conforming to the contour of the firearm, the portion between the legs being slightly raised from the surface of the firearm. A wear-resistant projection 74, made preferably of hardened steel and attachable to the mount body by being press-fitted into a suitable receiving opening in mount 60, depends from leg 70 in a direction substantially parallel with transverse receiving opening 76 on the left side of the firearm. Projection 74 is preferably merely a non-threaded stud of uniform diameter about 1/8 inch in length, although any configuration capable of functioning in the manner herein described is acceptable. Transverse receiving opening 76 is normally made longer than projection 74 so as to allow the rifle-contiguous surface of leg 70 to come in contact with the surface of the firearm.

Circumferentially disposed from opening 76 is a second transverse opening 78 in the firearm, this opening being approximately the same circumferential distance from the vertical center line as first opening 76 and is at an acute angle with respect thereto. The preferred angle between openings has been found to be between sixty and eighty degrees. Opening 78 is located underneath leg 72.

An opening through leg 72 is threadably tapped for receiving a screw and is at an angle greater with respect to opening 76 than is the angle of opening 78 with respect to opening 76. Screw 80 is operably movable in the tapped opening of leg 72 via a slot in its head by an instrument such as a quarter or other coin. The end of screw 80 is engageable with opening 78 and is tapered for bearing against the inside surface of opening 78 that is closest to opening 76. Upon tightening or adjustably inwardly advancing screw 80, the bearing action of the tapered screw surface with the inside surface of opening 78 urges the mount 60 as much in a clockwise direction as the inside surface of opening 76 will allow, as constrained by projection 74 located therein. It may be seen that positive location is provided by the locating surfaces of projection 74 in the mount body with opening 76 and that opening 78, the tapped opening in leg 72, and adjustably movable screw 80 provide a clamping means for laterally urging the projection against the inside surface of the first hole to perform the locating function just mentioned.

With the mount securely clamped in place as above described, it may be seen that not only cannot the mount move further in a circumferential direction, but the mount cannot move forward or backward either. This limitation in axial movement is caused by the circumferential dimension of opening 76. Assuming that opening 76 is circular, it has one portion which is closer to the vertical center line than any other portion thereof. This means that when projection 74 is pressed firmly in lateral contact with the inside surface of opening 76, it cannot move longitudinally with the firearm either forward or backward without shifting laterally. However, as previously mentioned, it is clamped to prevent lateral movement.

Moreover, it has been observed that with a right-hand screw thread on screw 80, the clamping action is actually made more secure with use. This phenomenon is probably the result of the difference in mass between the rifle to which the mount is secured and mount and telescopic sight assembly. The firing recoil apparently exerts a certain amount of right-hand twisting force or torque on the screw. The inside surface of the mounting hole moving sharply rearwardly with the rifle during recoil exerts the twisting force against the tapered contacting end of screw 80 to result in the tightening action.

With the mount firmly clamped to the firearm, the circumferential outside contacting surfaces of legs 70 and 72 share approximately equally the majority of the contacting pressure between the mount and the firearm.

As may be seen in FIG. 2, projection 74 has at its end a bevelled portion on the side opposite screw 80 to facilitate attachment to the firearm. That is, it is normal in attaching mount 60 to the firearm to first insert projection 74 into opening 76. The outside diameter of projection 74 is most conveniently very close to the inside diameter of opening 76, although there is a little bit of play. Bevelling or otherwise reducing the size of the tip end of the projection makes such insertion easier. By bevelling the side away from opening 78, the bevelling is done on the side that is not used at all for locating (provided the locating is done in accordance with the FIG. 4 description), or it enlarges the contacting area for the projection (at point 34, if locating is done in accordance with FIG. 5).

Screw 80 may be left attached to the mount with the tip slightly projecting beneath leg 72 at the time the mount is disassembled from the firearm. When attaching the mount, projection 74 is first conveniently inserted in opening 76 and the mount is moved about until the tip of screw 80 is received by opening 78. By not having to back off screw 80 very far and certainly by not having to remove it to accomplish removal of the mount, the ordinary way of disassembling the entire telescopic sight system including both mounts is not by loosening the clamps that secure the telescopic sight to the mounts but merely by loosening screws 80 on the forward and rearward mounts.

In fact, so convenient is it to remove the mount at this location, telescopic sights may be made which do not have removable clamps at all but have the mounts permanently affixed as part of their body assembly, one telescope being interchangeably mountable with another since each telescopic sight assembly or system would have its own mounts with locating and clamping projections as previously described.

In any event, when a mount has been removed there are no projections from the firearm to interfere with the use of the open firearm sights. Only the openings remain, and even these openings are not in the vertically centered position on the firearm to reflect light so as to interfere with the use of the open sights. That is, the openings are on the sides of the receiver and/or barrel, leaving the sighting surfaces unaffected.

Moreover, the boreholes in the firearm are not tapped and do not run along a longitudinal length of the firearm to weaken the receiver or other structure for possible blowout by expanding gases.

Figure 3:
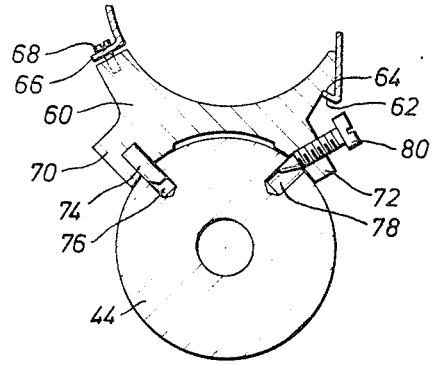
FIG. 3 is a cross-section view of a firearm showing a preferred mount in accordance with the present invention mounted on the firearm.
Figure 6:
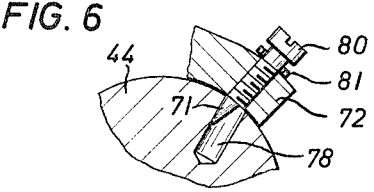
FIG. 6 is a partial cross-sectional view of an alternate embodiment of a mount in accordance with the present invention.

The embodiments shown in FIGS. 6–13 are alternate embodiments that may be used to accomplish the same locating and clamping functions as are accomplished by the mount shown in FIGS. 2–3. For example, FIG. 6 illustrates a very minor change from the embodiment shown in FIG. 3, the only difference being that tapered end 71 of screw 80, instead of being symmetrical, is eccentric. This allows a tightening of the screw 80 with less of a turn thereof than for the symmetrical taper. Obviously, the range of tightening to loosening would be less than half-a-turn. Also, a snap or lock washer 81 may be included, if desired, at the top of leg 72 where screw 80 is inserted to ensure that screw 80 does not loosen after it has once been tightened.

The embodiments shown in FIGS. 7–10 utilize a separate clamp structure in addition to a screw.

Figure 7:
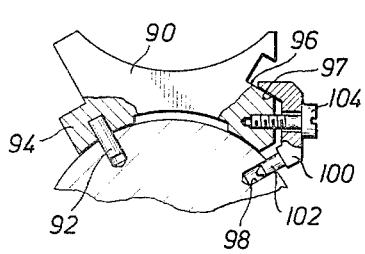
FIG. 7 is a partial cross-sectional view of another embodiment of a mount in accordance with the present invention.

The mount 90 shown in FIG. 7 has on the left side a projection 92 secured to a leg 94 essentially as described for the mount shown in FIG. 3. On the right side thereof, the body portion or means has a surface 96 non-adjacent the firearm that is on a converging angle with an opening 98. A clamp 100 has a projection 102 therefrom for insertion within opening 98 (but not necessarily at an acute angle therewith as with the mount described in FIG. 3). Clamp 100 has a surface 97 at an angle for mating with surface 96 on the body of mount 90. A screw 104 is threadably operable within a hole in clamp 100 and within a tapped receiving opening in body means 90. As screw 104 is tightened and surface 96 is drawn down mating surface 97 of clamp 100, the mount body is laterally and positively urged as before with respect to projection 96. To provide full tightening possibility, there is still clearance between clamp 100 and body 90 along mating surfaces 96 and 97 and at hole 98.

Figure 8:
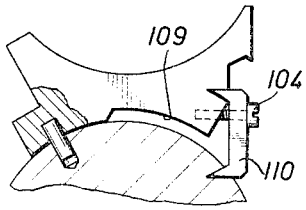
FIG. 8 is a partial cross-sectional view of still another embodiment of a mount in accordance with the present invention.
Figure 9:
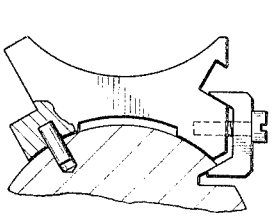
FIG. 9 is a partial cross-sectional view of yet another embodiment of a mount in accordance with the present invention.

Heretofore, it has been assumed that the opening at the clamping action is one which is essentially a borehole made into the surface of the firearm. A groove may as well be used for the second opening, provided that a suitable clamping means is used therewith. FIGS. 8 and 9 show two such convenient arrangements.

In FIG. 8 a clamp 110, similar to clamp 100 of FIG. 7 but having a suitable sloping mating surface with respect to the groove, is shown. In this embodiment of the inventive mount, as the mount is moved laterally to the right mount surface 109 closest to the firearm on the clamp side never actually comes in contact with the firearm, even upon full tightening of the clamp screw.

To effect clamping, the bottom and top inwardly turned legs of clamp 110 are wedged respectively into the groove in the surface of the firearm and a similar groove in the mount. Unlike the action along surfaces 96 and 97 of FIG. 7, in this embodiment the clamp is tightened by screw 104 until the legs are laterally limited by the grooves. Upon final further tightening, the body of the mount is secured laterally toward the clamp. The wedging of the clamp legs prevents downward movement of the right side of the mount or establishes a fixed distance between the mount and the surface of the firearm on the right side of the mount.

It may be seen that FIG. 9 shows a suitable mount dimensioning which permits the right leg of the mount to ride on the surface of the firearm as the mount is drawn toward the clamp. Except for the presence of the groove, rather than a borehole, clamping is the same as for FIG. 7.

Figure 10:
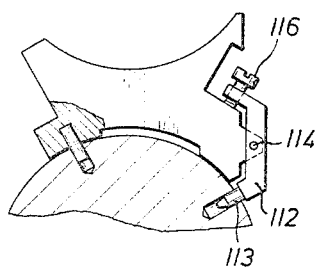
FIG. 10 is a partial cross-sectional view of an additional embodiment of a mount in accordance with the present invention.

FIG. 10 shows a clamp 112 pivoted to mount body at pivot 114, which pivot is located in the approximate center of the clamp. Pivot 114 most conveniently allows rotation about an axis which is parallel to the missile bore. As with the clamp structure shown in FIG. 7, the clamp has a projection 113 for entering a suitable opening in the firearm on one side of pivot 114. On the other side of pivot 114, a screw 116 is operably movable in a hole tapped through clamp 112 that allows the screw to contact a sloping surface on the main body. As the screw is turned to effect clockwise rotation of clamp 112 about pivot 114, projection 113 is anchored into the firearm opening, and the mount body is urged to the right through pivot connection 114. To provide a full range of tightening, there is clearance between clamp 112 and the body of the mount at the opening where projection 113 is anchored.

Figure 11:
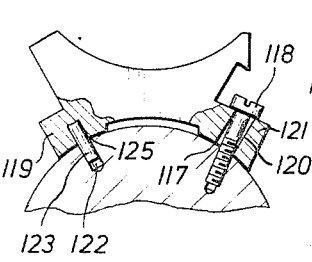
FIG. 11 is a partial cross-sectional view of still an additional embodiment of a mount in accordance with the present invention.

FIG. 11 shows a mount which effects clamping via a screw on the right side that operates within a tapped hole in the firearm, unlike the bored-type opening shown in FIG. 3. In this instance, the tapped opening is on an angle which allows the screw 118 operating therein to be screwed on an axis which is a little more critical than for the other embodiments, which will become apparent from the discussion below.

Projection 123 depending from left leg 119 fits into opening 122 to form the V-shaped locating surfaces discussed in connection with FIG. 4. Point 125 is the point between these V-shaped surfaces at the firearm surface of opening 122.

Right leg 121 has an opening 120 therethrough which is not tapped and which is made larger in diameter than the diameter of screw 118 and allows screw 118 to slip freely therethrough. On the underneath side of leg 121 this right mount opening has, on the side thereof nearest the centerline of the mount, a point 117.

As screw 118 is advanced, the head thereof comes into contact with the top surface of mount leg 121, forcing the leg downward against the surface of the firearm. The axis along which the screw advances must also, to achieve clamping action, cause point 117 to move further from point 125 than before tightening. Therefore, if point 125 is considered to be the center of a circular arc drawn through point 117, the axis for screw 118 must be such as to carry point 117 outside of that arc (further from point 125).

In order for screw 118 to tighten the mount in the manner just described, it must bear against the inside surface of the opening through leg 121 at some point. Since opening 120 is larger in diameter than screw 118, it also must be at an angle therewith (and hence at an angle with respect to the tapped opening in which screw 118 is screwed). The mount opening angle illustrated in FIG. 11 is greater with respect to opening 122 than screw 118; however, the opposite condition could prevail provided tightening at point 125 is effected, as described above.

Figure 12:
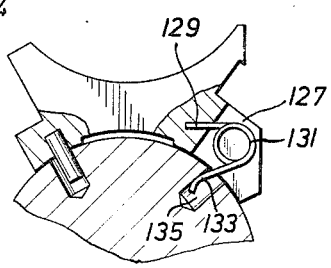
FIG. 12 is a partial cross-sectional view of yet an additional embodiment of a mount in accordance with the present invention.

In FIG. 12 an embodiment having a spring-type clamping means is shown in which right leg 127 has embedded therein, or otherwise carries, a leg 129 of coiled compression spring 131. The one or more turns of the spring rest conveniently in a cleavage in leg 127 so that its depending leg 133 slips into a borehole 135 located underneath leg 129. The compression of the spring is such that spring leg 133 bears sufficiently strongly against the inside surface of opening 135 that the body of the mount is urged to the right and downward against the locating V-surfaces of the left leg projection, as with the other embodiments.

Figure 13:
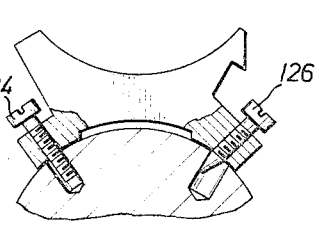
FIG. 13 is a partial cross-sectional view of one more embodiment of a mount in accordance with the present invention.

In FIG. 13, a sructure is shown which does not include a projection which is affixedly attached to the mount body. On the left side of this mount, where the affixedly attached projections have heretofore been located, a screw 124 is shown which is screw-tapped through the leg on that side. This secures the projection to the body leg on the left. On the right side, screw 126 is operable through a suitable tapped opening in the leg on that side in a manner similar to screw 80 in FIG. 3. Also, screw 126 includes a taper for operating with respect to the inside surface of the opening in a manner similar to that for screw 80. In operation, after screw 124 is located within its opening, the clamping and locating functions are accomplished by the tightening of screw 126 in a manner which is identical with that which is described for the clamp shown in FIG. 3.

Figure 14:
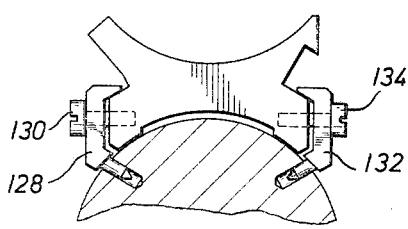
FIG. 14 is a partial cross-sectional view of an embodiment of a mount in accordance with the present invention that is laterally adjustable in its locating position.

The mounts which have been described above have all included a projection which is either permanently affixed or, as with FIG. 13, movably fixed with respect to the mount. FIG. 14, on the other hand, shows a mount which operates with respect to projections, neither of which is affixed directly to the mount body. In this embodiment, a suitable clamp 128 of the type described for the embodiment shown in FIG. 7 is located on the left and is tightenable to anchor its projection to the firearm and the clamp to the mount body by screw 130 operating with respect to a suitable lateral tapped screwhole in the body on that side. On the right side an identical clamp 132, tightenable via screw 134, is shown. Clamping and locating may be effected either by operating clamp 130 or clamp 134. However, in addition to the clamping and locating functions by either one of the clamps shown in this structure, it is possible to also make lateral adjustment of the entire mount structure by loosening one of the screws (130 or 134) and tightening the other. Of course, clearance must be provided between the clamps and the mount body to accomplish this adjustment. This allows the user of this type of mount to have an effective windage adjustment control to the telescopic sight through the clamping means.

Figure 15:
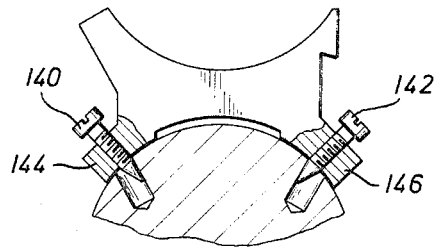
FIG. 15 is a partial cross-sectional view of another embodiment of a mount in accordance with the present invention that is laterally adjustable in its locating position.

FIG. 15 shows another type of structure in which a lateral adjustment of the mount is possible. Here, screws 140 and 142 are operable with respective legs 144 and 146 located on opposite sides of the mount there shown, in a manner similar to screw 80 in FIG. 3. That is, each screw 140 and 142 is received through a suitable tapped opening in the mount legs with which they operate, and each includes a tapered end for operating with respect to an opening in the firearm. Screws 140 and 142 are slanted more toward the center line between the openings than the slanted angles of the openings themselves. Hence, tightening is caused when either screw is moved inwardly of its opening. Again, this means that locating and clamping is achieved as with FIG. 3 by either screw 140 or 142 and, in addition, windage or lateral adjustment of the telescopic sight carried by the mount is achievable by loosening one of the screws 140 and 142 and tightening the other.

Figure 16:
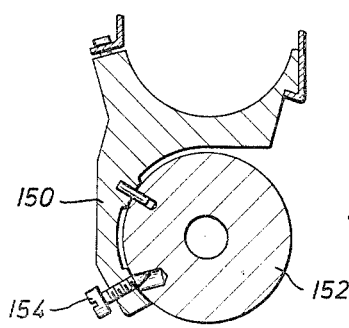
FIG. 16 is a partial cross-sectional viewc of a typical side mount in accordance with the present invention connected to a firearm and showing a preferred configuration of locating parts.

Finally, as shown in FIG. 16, it is possible to have a suitable side mount structure 150 which is attachable to the firearm 152 via openings on the side of the receiver or firearm barrel, rather than in openings located near the top thereof. The clamping action via screw 154 is identical with that previously described for screw 80 in the FIG. 3 embodiment. Also, any of the alternate embodiments shown in FIGS. 6–15 may also be employed in a side mount configuration, is desired, rather than a top mount configuration.

Should the opening in which the adjustable or control projection operate be a groove, it would normally not have a circumferential dimension to help limit axial movement of the mount. This limitation in axial movement would be provided solely by the circumferential dimension in the opening in which the locating projection operates. However, just as it is desirable to scoop or otherwise notch a groove for the locating projection, it is possible to scoop or otherwise notch a groove for the adjustable projection. Hence, a balanced sharing of the axial limiting function is provided between both openings and both projections.

While several embodiments of the invention have been described, it is obvious that various substitutions or modifications of structures may be made without varying from the scope of the invention.

What is claimed is:

1. A mount for mounting a telescopic sight to a supporting means adapted to be rigidly secured to a firearm wherein one of the mount and supporting means has an opening in its outside surface that is transverse with respect to the missile bore of the firearm and having at least a partial circumferential dimension defined by opposed wall portions oblique with the axis of the missile bore, said mount comprising. a projection affixed to the other of said mount and said supporting means from that which has said opening for insertion within said opening, clamp means between said mount and supporting means for laterally urging said projection against said opposed wall portions of said opening to circumferentially locate the mount, said opposed wall portions of said opening also limiting the relative axial movement of the mount by contact with said projection.

2. A mount for securing a telescope sight to a firearm, said mount comprising:
   (a) supporting means rigidly secured to said firearm, said supporting means having a first opening therein elongated transversely of the axis of said firearm, said first opening having at least a partial circumferential dimension defined by opposed side wall portions oblique with respect to the missile bore of the firearm;

(b) body means for carrying the telescopic sight, said body means including a dependent projection for insertion into said first opening in said supporting means; and (c) clamp means secured to said body means and engageable with said supporting means, said clamp means being operative to laterally urge said dependent projection snugly against said opposed wall portions on said first opening to axially and circumferentially affix said body means to said supporting means.

3. A mount as described in claim 2, wherein said clamp means includes a second opening in said supporting means transverse with respect to the missile bore at a converging angle with respect to said first named opening, a clamp having a second projection for insertion within said second opening and pivoted with respect to said body means, and screw means connected between said clamp and said body means for anchoring said second projection in said second opening and effecting lateral urging of said body means toward said clamp.

4. A mount as described in claim 3, wherein said clamp includes a third opening threadably tapped to receive a screw, and said screw means includes a screw operably engageable within said threadably tapped opening and contacting said body means.

5. A mount as described in claim 2, wherein said clamp means includes a second opening in said supporting means transverse with respect to the missile bore at a converging angle with respect to said first named opening, and a compression spring having a portion bearing against the inside surface of said second opening to effect the latter urging.

6. A mount as described in claim 2, wherein said projection is of a wear-resistant substance and fixedly attached to said body means.

7. A mount as described in claim 6, wherein said projection is of hardened steel press-fitted within a suitable receiving opening in said body means.

8. A mount as described in claim 2, wherein said projection is threadably connected within a suitable receiving opening in said body means.

9. The mount of claim 2, wherein said first opening has a side wall defining a closed geometrical figure when viewed in cross-section.

10. The mount of claim 2, wherein said first opening has a side wall which is circular in cross-section.

11. The mount of claim 2, further comprising a second elongated opening in said supporting means circumferentially spaced from said first opening and convergent therewith, and wherein said clamp means includes a second projection attachable to said body means for insertion into said second opening, said second projection being movable along a path which is disposed at an angle to the axis of said second opening to force said second projection against a side wall of said second opening to effect the lateral urging of said dependent projection.

12. The mount of claim 11, wherein said body means is threadably tapped opposite said second opening, and said second projection is circumferentially threaded along at least a portion of its length so as to make said second projection adjustably movable.

13. The mount of claim 12, wherein the end of said second projection effecting pressure with the side wall of said second opening is eccentric.

14. The mount of claim 11, wherein said second opening includes at least a partial circumferential dimension defined by opposed side wall portions oblique with respect to the missile bore of the firearm so that said last mentioned side wall portions limit axial movement of said body means.

15. The mount of claim 11, wherein said body means has a first portion contacting the surface of said supporting means on the circumferentially opposite side of said first opening from said second opening and said body means has a second portion contacting the surface of said supporting means at approximately the second opening, said first and second portions sharing the majority of contacting pressure between said body means and said supporting means.

16. The mount of claim 11, further comprising screw means connected between said clamp means and said body means for anchoring said second projection in said second opening and effecting lateral urging of said body means toward said clamp means.

17. A mount as described in claim 16, wherein said clamp means is operably connected with said body means to maintain said body means a fixed distance from said supporting means.

18. A mount as described in claim 16, wherein said body means has a surface non-adjacent the firearm that is on a converging angle with said second opening, and said clamp means has a surface mating with said body means surface such that upon tightening of said screw means said body means is urged laterally and toward the surface of the supporting means.

19. A mount as described in claim 18, wherein said body means has a first portion contacting the surface of said supporting means on the circumferentially opposite side of the first opening from said second opening, and said body means has a second portion contacting the surface of said supporting means at approximately the second opening, the first and second portions sharing the majority of contacting pressure between said mount and said supporting means.

20. A mount for securing a telescope sight to a firearm, said mount comprising:

(a) body means adapted to be secured to the telescope sight, said body means having an arcuate bottom surface;

(b) cylindrical stud means secured to said body means and projecting from said arcuate bottom surface, said stud means extending generally radially with respect to said arcuate bottom surface; and (c) clamp means attached to said body means, said clamp means including a portion projecting from said arcuate bottom surface and convergent with said stud means.

21. A mount for securing a telescope sight to a firearm, said mount comprising:

(a) supporting means rigidly secured to said firearm, said supporting means having an arcuate top surface and a first generally cylindrical opening extending generally radially of said arcuate top surface;

(b) body means for carrying the telescope sight, said body means having an arcuate bottom surface in face-to-face contact with said arcuate top surface, said body means including a dependent generally cylindrical projection extending into said cylindrical opening; and (c) clamp means secured to said body means and engageable with said supporting means, said clamp means being operative to laterally urge said dependent projection snugly against the side wall of said cylindrical opening to axially and circumferentially affix said body means to said supporting means.

22. A mount for mounting a telescopic sight to a supporting means rigidly secured to a firearm, said supporting means having a first tubular opening in its outside surface, and a second opening circumferentially spaced from said first tubular opening and convergent therewith, both of said openings being transverse to the missile bore of the firearm, said mount comprising:
 (a) body means for carrying the telescopic sight;
 (b) first tubular projection means attached to said body means, said first tubular projection means being disposed for insertion into said first tubular opening in said supporting means; and
 (c) second projection means threadedly attached to said body means at a location circumferentially spaced from said first tubular projection means and aligned for insertion into said second opening in said supporting means, said second projection means being threadedly advanceable toward said second opening and operable to urge said first tubular projection into snug engagement with side walls of said first tubular opening, said tubular opening and tubular projection thereby providing a positive stop operative to limit axial, radial, and circumferential movement of said body with respect to said support-means.

References Cited

UNITED STATES PATENTS

| | | | |
|---|---|---|---|
| 1,688,765 | 10/1928 | Veras | 248—226 X |
| 2,622,329 | 12/1952 | Demick et al. | 33—50 |
| 3,040,433 | 6/1962 | Heinzel | 33—50 |
| 3,405,448 | 10/1968 | Weatherby | 33—50 |

FOREIGN PATENTS

| | | |
|---|---|---|
| 199,957 | 6/1907 | Germany. |
| 937,659 | 9/1963 | Great Britain. |

ROY D. FRAZIER, Primary Examiner

J. FRANKLIN FOSS, Assistant Examiner

U.S. Cl. X.R.

33—50; 248—205